No. 846,845. PATENTED MAR. 12, 1907.
J. C. W. GRETH.
WATER PURIFYING APPARATUS.
APPLICATION FILED OCT. 22, 1903.
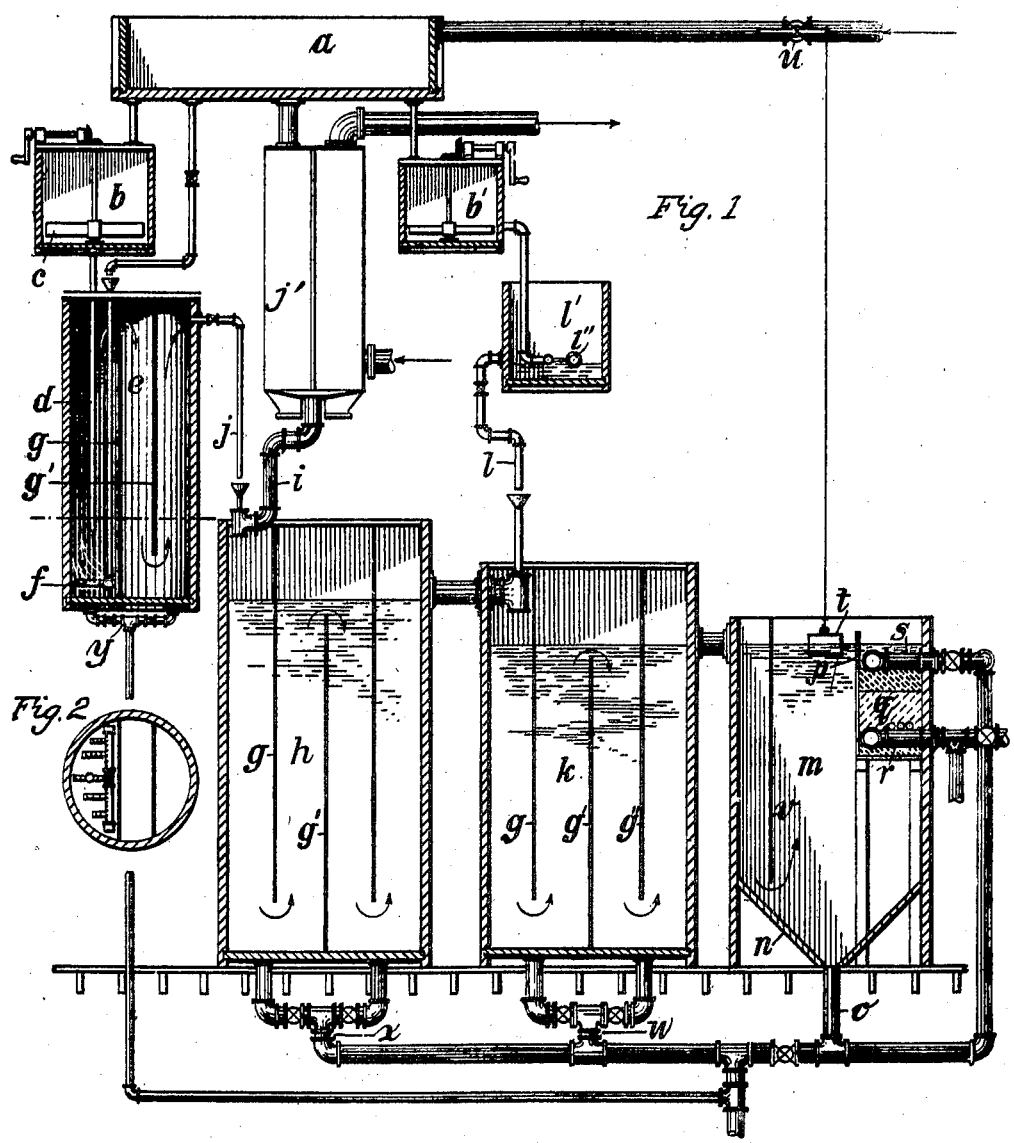

UNITED STATES PATENT OFFICE.

JOHN C. W. GRETH, OF PITTSBURG, PENNSYLVANIA, ASSIGNOR TO WM. B. SCAIFE & SONS COMPANY, OF PITTSBURG, PENNSYLVANIA, A CORPORATION OF NEW JERSEY.

WATER-PURIFYING APPARATUS.

No. 846,845.   Specification of Letters Patent.   Patented March 12, 1907.

Application filed October 22, 1903. Serial No. 178,084.

*To all whom it may concern:*

Be it known that I, JOHN C. WM. GRETH, a citizen of the United States, residing at Pittsburg, in the county of Allegheny and State of Pennsylvania, have invented certain new and useful Improvements in Water-Purifying Apparatus, of which the following is a specification.

My invention relates to the art of water purifying, and particularly to continuously operating apparatus for the chemical removal of impurities in the water and mechanically filtering the same. The objects of the invention are, to provide a series of vessels through which the water flows in continuous current so as to avoid stagnant water at any point and at the same time provide for the removal of precipitated sediment at various points; to provide means for securing a uniform and thorough admixture of neutralizing and precipitating agents for the purpose of agglomerating and removing impurities; to provide means for thoroughly and uniformly mixing milk of lime etc. in the water during a regulated flow through the apparatus; to provide a superior means for settling and removing the sediment from the water, an efficient form of filter, and to generally improve the structure and operation of water purifying apparatus.

The above objects, together with other advantages which will hereinafter appear, I attain by means of the construction illustrated in preferred form in the accompanying drawing, in which—

Figure 1 is a vertical central section through the entire apparatus, and

Figure 2 is a horizontal cross section taken through the saturating tank $e$.

The apparatus is designed more particularly for use in the operation of commingling with the water a definite quantity of lime hydrate for the purpose of taking out carbon dioxide, precipitating bi-carbonates, etc., and causing the agglomeration of several kinds of impurities in the water, then neutralizing and precipitating various other impurities by the admixture of some reagent, and finally settling the water in a settling tank and passing it through a filter. In such apparatus it is found to be of the highest importance that the hydrate of lime formed by slaking caustic lime shall be very homogeneously mixed. For this purpose it will be seen in the accompanying drawing that I provide the distributing tank $a$ and a pipe leading to the stirring box $b$, which is provided with some mechanical means such as the rotating vane $c$ for the purpose of slaking, and mixing the cream of lime, which is at intervals, as required, passed by means of the pipe $d$ into the tank $e$, emptying near the bottom of the same. A pipe from the tank $a$ having a distributing outlet $f$ empties into the tank $e$ at a point beneath the cream of lime introduced from tank $b$, and by means of the partitions $g$ and $g'$ the water is caused to flow first upward, carrying up cream of lime with it, then downward, then upward again, to the outlet through the pipe $j$. It will be seen that by this provision for the upward current of water from the outlet $f$, rising through the lime, and the alternate inversions of the flow through the tank, I attain a very perfect and a very uniform commingling of the water and lime to form the saturated hydrate which is subsequently to be used for the purposes hereinafter described.

The water pipe leading into the saturating tank $e$ being regulated, the supply of hydrate may be whatever desired while the tank always maintains a fully saturated solution, whatever may be the rate of the flow. The discharge through the pipe $j$ is preferably carried into a funnel and enters the stream of raw water as it enters through the pipe $i$ coming directly or indirectly from the distributing tank $a$. This causes the hydrate of lime and the water to descend together in the tank $h$, and in this case also the partitions $g$, $g'$ are arranged to direct the flow through the tank, first downward then upward, in turn, making several reverse vertical changes in the course of flow, causing a very thorough mixing of the hydrate with the water for the purpose of precipitating certain bi-carbonates by the hydrate of lime, or forming carbonates with any free carbonic acid, or removing various bacteria and impurities in the water, as will be understood by those familiar with the art. The construction of the tanks prevents the possibility of any portion of the water remaining quiescent or stagnant and at the same time, while there is a continuous flow of the current, the precipitates may be discharged as they settle in the bottom of the tank through the discharge pipe $x$. Under some conditoins, where heat will facilitate or hasten the chemical action, I employ the heater $j'$, which may be introduced in the apparatus somewhere between the distributing tank $a$ and the tank $h$.

Though some impurities may be agglomerated and precipitated by means of the excess of the lime over that required to precipitate the bi-carbonates, etc., and some of the acids may be destroyed by the calcium hydrate, in other cases it is generally necessary to use a separate reagent for the precipitation of various matters, and for this purpose the tank $k$ is provided. The stream of water overflowing from tank $h$ enters into tank $k$ as shown, and is met at the inlet by a stream of the required chemical, which may be for example, sodium carbonate or barium hydrate, or some other reagent as desired. This is mixed in the box $b'$, and flows into regulating tank $l'$, which is maintained at a uniform head by means of a common float and valve $l''$ as shown, and is discharged as required into the chemical tank by pipe $l$ which empties into a funnel and comes directly into the incoming stream of water. The mixed liquids are carried downward together and in this tank also the provision is made for the vertically inverse flow of current for the purposes heretofore described, and the water is finally overflowed into the settling tank $m$. The bi-carbonates will sometimes themselves form insoluble compounds with such substances as oils, and the inverse currents are necessary to commingle such matter in the solution. The substances precipitated may be drawn off through the outlets $w$.

For the purpose of finally removing whatever precipitated substances may remain, the settling tank $m$ is provided with a partition $v$ which directs the current of incoming water downwards against the inclined bottom $m$ which ends in an outlet $o$ to discharge the sediment. The flow through this settling tank will be slow, and a final purification may be provided by means of filter $q$ which is placed inside of the partition $p$ and receives water by overflow thereof. The level of the water in this tank, $m$, will be conveniently regulated by means of a float $t$ which is connected to the valve $u$ in the pipe supplying the distributing tank $a$. This may be regulated to suit the desired yield of purified water. The water flowing into filter $q$ passes through several strata of sand or the like and out through the pipe $r$. For the purpose of cleaning this filter I provide the double set of pipes in such a way as to enable a reversal of the current flowing through the filter $q$ in order to clean the same, as will be clearly understood.

It will be observed that this apparatus combines the following features which are found to be necessary for the provision of a continuously flowing water purifying apparatus which allows of proper precipitation of the sediments therein and prevents the stagnation of the water at any point of the flow. The arrangement of the partitions in the various tanks, prevents the separation of the lighter and the heavier parts of the liquid mixture because the current that sweeps under the partitions $g$ carries up within a narrow space the whole of the liquid. The arrangement of the tank for making the saturated hydrate of lime is described and claimed in my co-pending Patent No. 753,880, issued March 8, 1904. The introduction of the hydrate of lime through the pipe $j$ immediately at the entrance of the stream of water from the distributing tank $a$ causes the two liquids to come together at the point in the flow when there is the greatest amount of agitation and therefore the most thorough mixing of the same, and the leading of this intermixture immediately downward prevents the settling of the heavier liquid through the lighter and insures a thorough commingling of the two ingredients. The same feature is shown in the tank $k$ which is for the purpose of mixing the reagent for throwing down various precipitates of impure matter. By means of the partition $v$ the water entering into the settling tank is immediately led to the bottom of the same and after passing under the partition is allowed full and free expansion so as o deaden the current of water and cause the greatest possible efficiency in the matter of settling sediment, while the introduction of the water into the filter by overflow over the partition $p$ will additionally assist in preventing the bearing of any great amount of sediment into the filter. Other advantages of this device will readily occur to those familiar with the art.

Having thus described my invention and illustrated its use, what I claim as new, and desire to secure by Letters Patent, is the following:

1. In water purifying apparatus the combination of a distributing tank, a pair of mixing tanks for chemicals, a hydrate saturating tank, a treatment tank, a chemical tank and a settling tank, each of said tanks being provided with means for causing vertically reverse flow therethrough, and an automatic regulator for the water level in the settling tank.

2. In water purifying apparatus the combination of a lime saturating tank, a lime treatment tank, a soda treatment tank, and a settling and filtering tank, each of said tanks feeding the next by overflow, and having means to cause vertically reverse flow therethrough, and means to introduce the lime and soda into each of the treatment tanks directly in the inflowing stream of water, out of contact with the air, a supply tank for the whole system and means for regulating the supply automatically by the water level in said settling tank, substantially as described.

In testimony whereof I have hereunder signed my name in the presence of the two subscribed witnesses.

JOHN C. W. GRETH.

Witnesses:
F. W. H. CLAY,
CHAS. H. EBERT.